United States Patent [19]

Rothert

[11] Patent Number: 5,758,598
[45] Date of Patent: Jun. 2, 1998

[54] CREEP FEEDER DEVICE

[75] Inventor: C. Rodney Rothert, Basco, Ill.

[73] Assignee: Hawkeye Steel Products, Inc., Houghton, Iowa

[21] Appl. No.: 609,102

[22] Filed: Feb. 29, 1996

[51] Int. Cl.⁶ ............................................. A01K 5/01
[52] U.S. Cl. ................................... 119/61; 119/515
[58] Field of Search ........................ 119/61, 454, 456, 119/464, 477, 515, 521

[56] References Cited

U.S. PATENT DOCUMENTS

| 491,702 | 2/1893 | Felix | 119/61 |
|---|---|---|---|
| 2,759,452 | 8/1956 | Arthur | 119/61 |
| 2,789,537 | 4/1957 | Bailey | 119/61 |
| 2,813,509 | 11/1957 | Bruno | 119/51 |
| 3,202,131 | 8/1965 | Jones | 119/61 |
| 3,734,062 | 5/1973 | O'Hara | 119/61 |
| 5,224,443 | 7/1993 | Leslie | 119/515 |
| 5,406,909 | 4/1995 | Wenstrand | 119/61 |
| 5,526,773 | 6/1996 | Richardson | 119/61 X |

FOREIGN PATENT DOCUMENTS

| 109533 | 1/1940 | Australia | 119/61 |
|---|---|---|---|
| 1187812 | 8/1957 | France | 119/61 |

Primary Examiner—Robert P. Swiatek
Assistant Examiner—Elizabeth Shaw
Attorney, Agent, or Firm—Robert A. Brown

[57] ABSTRACT

A feeder dish for use in raising small pigs operable to be secured in place on a perforated creep floor of a farrowing pen and resistant to movement by the feeding piglets. The feeder includes a pan for holding feed surrounded by an integral platform on which the piglets stand. Pegs extend downwardly below the pan for insertion into slots or openings in the floor of the pen and maintain the feeder in a preselected position so as to prevent the dish from sliding or tipping over.

13 Claims, 2 Drawing Sheets

CREEP FEEDER DEVICE

BACKGROUND OF THE INVENTION

The present invention relates generally to pigling or piglet trough feeders for use by baby pigs immediately or shortly after their birth and more particularly to a pig creep feeder device that may be releasably positioned in any preselected location on the floor of a piglet feeding pen. The feeder device is constructed in a manner that prevents it from being pushed about on the pen floor and is secured to the floor so that it can not be tipped over by piglets standing thereon.

It is common practice to "creep feed" small pigs during the process of being weaned from their mother sow. This process begins at about six to seven days after birth when the piglets are able to consume feed that will contribute to their rapid growth. It is important at this stage in the life of a pig to receive a well balanced nutritionally sound diet, not only for survival, but for its proper development.

Generally, feed is made available to weaning piglets in a number of ways. The feed may be placed in troughs, receptacles, pans or other types of open containers fastened to a wall of a farrowing pen or crate in which the piglets have access, but the mother sow is kept separated therefrom. Feeders fastened to a wall of a pen are not accessible to most of the piglets. The smaller animals or "runts" are crowded out from and away from the limited linear feeding space along a wall. Further, a wall mounted feeder requires dismounting in order to be cleaned which adds to the cost of maintaining a sanitary, disease free environment. In addition, piglets aggressively feeding from wall mounted structures are likely to spill and waste the expensive food which may cost as much as $1200 per ton.

Another problem encountered with this type of feeder, as mentioned above, is that there is only one side of the trough available for feeding. Thus, a substantial portion of the linear periphery of the feeder can not be used. This problem is particularly critical when the feeder is fastened in a corner of the pen. The end result is that the more aggressive piglets grow more rapidly than the smaller piglets and an economic imbalance is created that prevents maximum return on investment.

Prior art disclosures which are relevant to the present invention are found in U.S. Pat. No. 2,789,537 to Bailey; 2,813,509 in the name of Bruno; 3,202,131 to Jones; and Australian Patent 109,533. Bailey's object is to provide a feeder trough to help unweaned pigs drink milk or other fluids. Bailey discloses a trough having walls and an apron that does not extend about all of the walls, nor does he teach the use of stabilizing pegs. Bruno shows a circularly shaped feeder, but no spikes or pegs. Jones depicts a walled feeder without apron, but includes pivoted pegs that are normally retracted. These references are singular in their contribution to advancement in the art, but fail to provide solutions to present day problems in the manner claimed by the present invention.

SUMMARY OF THE INVENTION

The present invention provides for a discrete, generally circular, concave or dish-like construction that can be securely positioned in any desired located on the floor of a perforated floor of a feeding pen. The circular periphery or circumferential linear length of the feeder makes its possible for all of the piglets to have greater access and uninterrupted space in which to feed. Placement of the feeder of the present invention in the pen spaced from the walls thereof, of course, contributes greatly to accessibility and quicker discovery by the pigs than prior feeders mounted on or placed against walls of a pen and similar locations. It is axiomatic that equal access to food will provide a piglet the opportunity to obtain an early, appropriate nutritive diet that is vital to rapid growth and development of the piglet to adulthood, which, of course is an important economic consideration. Further, the feeder is constructed so that tipping over is virtually impossible and any substantial movement by a rooting piglet is strongly inhibited. Cleaning of the feeder is also easier to accomplish and made more thorough because of the simplicity of the design in that there is no requirement for detachment in order to wash the feeder. Additionally, it is much more easy to pour the feed into an open dish-like structure as provided by the feeder of the present invention than to place feed in a close-quartered wall mounted feeder.

Accordingly, it is an object of the present invention to provide a creep feeder device for use in combination with a perforated floor of a farrowing crate that remains stationary during piglet feeding thereat.

It is a further object of the present invention to provide a creep feeder device for use in combination with a perforated floor of a farrowing pen or crate that is of heavy, sturdy construction, has an open, upper accessible bowl, a lower substantially wide apron therearound and a plurality of holding means for engagement with the perforated floor to stabilize the device during piglet feeding thereat.

The above and further objects are achieved in accordance with the present invention wherein there is provided a creep feeder device comprising substantially circular base member means for engaging in contact with perforated floor means of a farrowing pen or crate, circular wall means integrally formed with and rising from the base member means for receiving piglet feed therein, the base member means having a diameter substantially greater than a diameter of the wall means, apron means extending outwardly from and completely around the wall means and having a width substantially equal to the difference between the diameter of the base member means and the diameter of the wall means, and and a plurality of peg means extending downwardly in a direction substantially normal to a bottom side of the base member means for interstitial engagement with individual openings of said perforated floor means.

DESCRIPTION OF A PREFERRED EMBODIMENT

Figure 1:
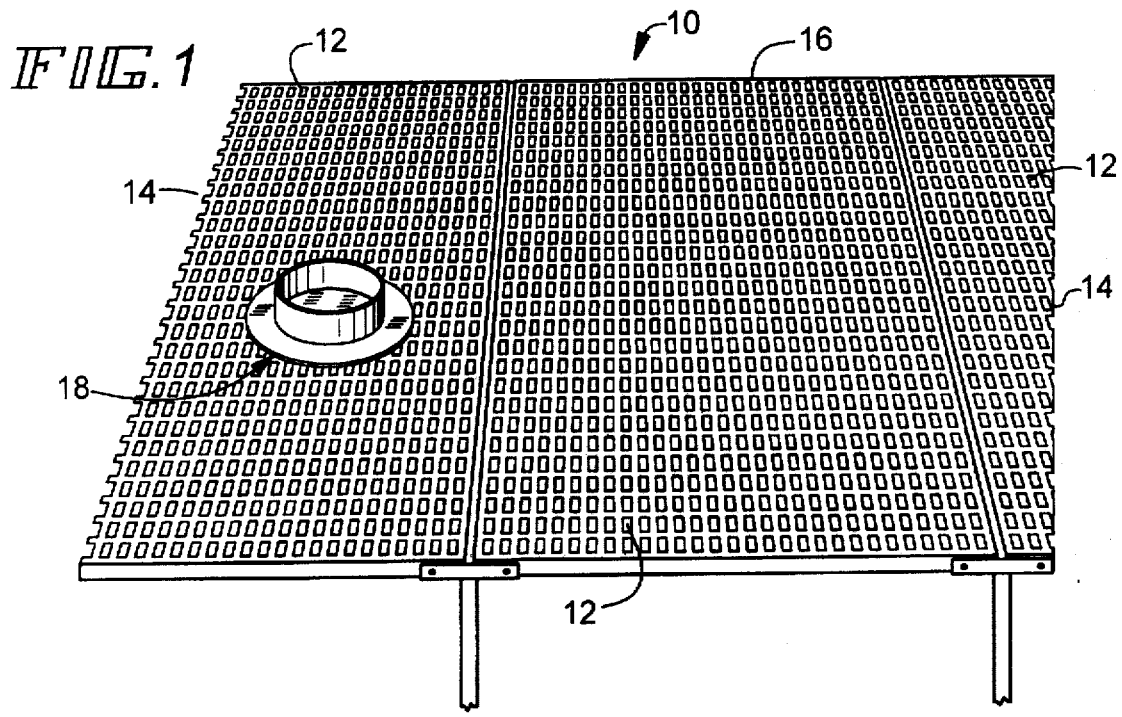
FIG. 1 is a perspective view of a floor area of a farrowing pen wherein the feeder device of the present invention is shown securely engaged with perforations formed in a creep feed portion of the pen.
Figure 2:
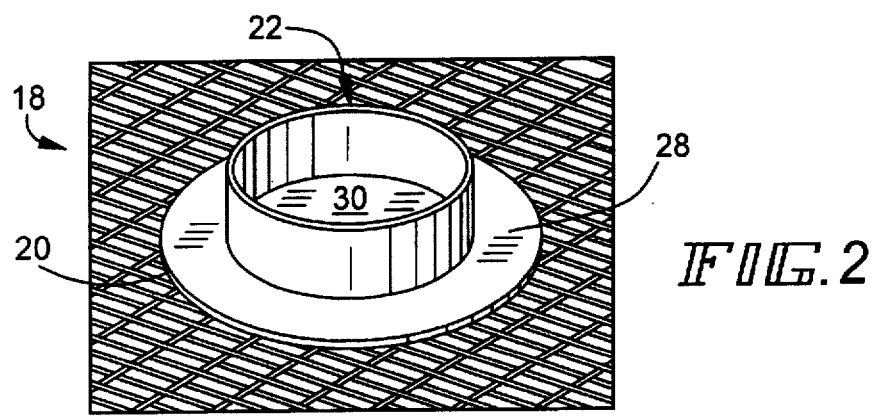
FIG. 2 is a somewhat enlarged perspective view of the feeder device depicted in FIG. 1 providing greater detail of the structural engagement between the device and the perforated floor of the pen.
Figure 3:
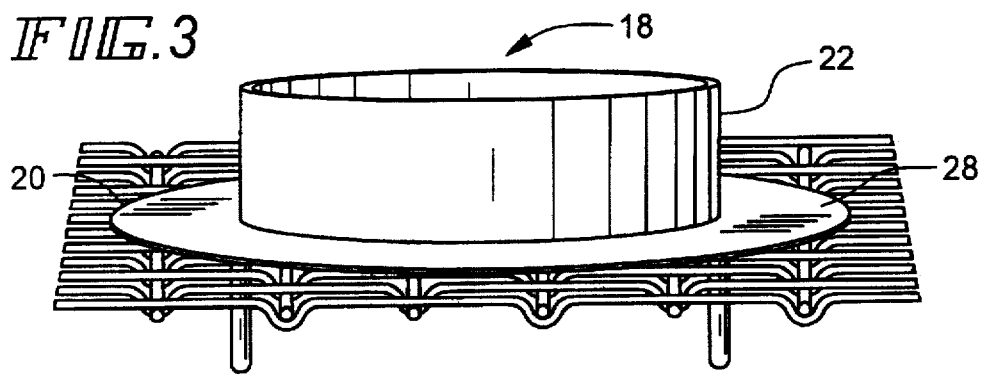
FIG. 3 is an elevational, partial perspective view of the feeder device showing pegs extending downwardly from the bottom of the device through openings of the perforated floor for secure engagement therewith.

Referring now to FIG. 1, there is shown a floor portion or area, generally identified by reference numeral 10, of a part of a farrowing pen. The floor space 10 is constructed from solid, galvanized steel or other suitable material and formed to provide multiple openings or perforations 12 therethrough for ease in handling and disposing of manure as is well known in the pig raising industry. The floor area comprises a creep portion 14 for piglets and a control portion 16 for a sow which are usually walled apart by panels (not shown) or other suitable means to keep the weaning piglets separated from their mother sow.

A creep feeder dish, generally identified by reference numeral 18, is shown disposed upon the creep portion 14 in a preselected position and secured thereat by means hereinafter described in detail. The dish 18 is formed from plastic, such as polypropylene or other suitable material and constructed in the shape of a generally circular, flat, plate-like base member means 20. Formed integrally with the base member means and rising upwardly therefrom is a generally circular wall means 22. The base member means 20 has an overall dimensional diameter 24 that is substantially greater than a dimensional diameter 26 of the wall means 22 and thereby forms completely therearound an apron 28. The apron 28 is effective to permit a piglet to place its forelegs thereon so as to facilitate its obtaining feed from the dish. It is contemplated that the apron 28 would have a width of at least two inches to accommodate a piglet of usual proportions, but additional dimensions of width could be used in accordance with the present invention.

Figure 5:
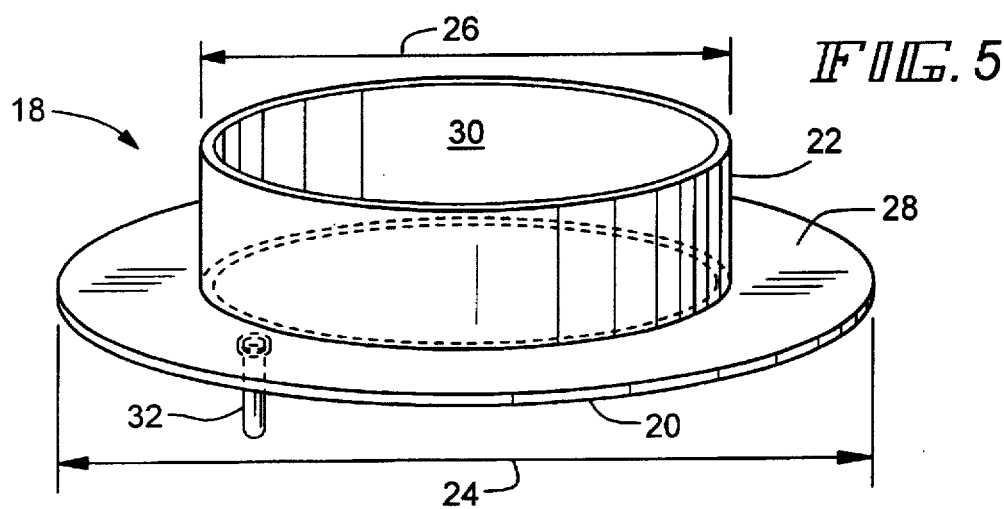
FIG. 5 is a generally top side perspective view of the feeder showing in greater detail structure thereof.
Figure 6:
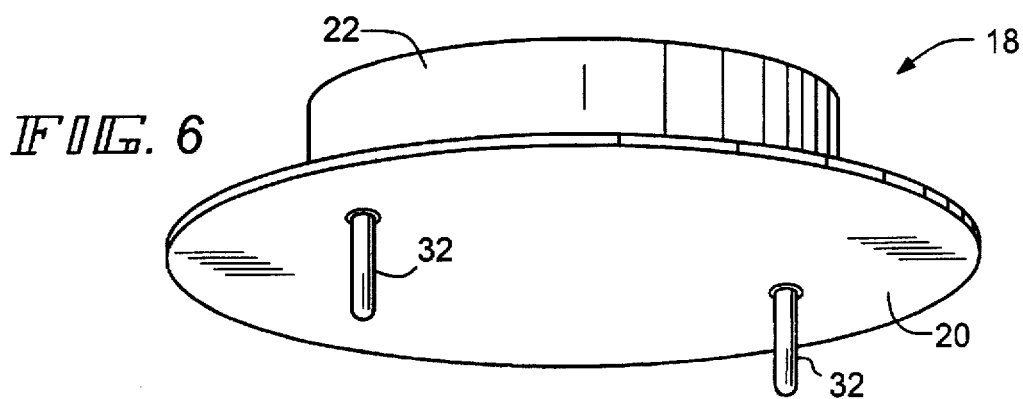
FIG. 6 is a view similar to FIG. 5 showing perspective from a bottom side of the feeder.

The wall means 22 and an upper, top side of the base means 20 cooperate to form a cavity 30 for receiving feed to be consumed by a weaning piglet. As best seen in FIGS. 5 and 6, a plurality of elongate, cylindrically shaped peg means 32 are threadably or otherwise fixedly secured to an under side of the base member means 20. The peg means 32 may be formed from steel or other suitable means having one end connected to the bottom side of the base member means and the other end rounded over or otherwise formed to facilitate penetrating the perforations 12 or openings in the creep portion 14 of the floor of the pen when the dish is placed thereon. The peg means 32 have suitable longitudinal and diametral dimensions that fit within the perforations of the floor in a manner that allows ease of entry and exit, but prevents excessive sliding and tipping over of the dish. As a consequence, the peg means 32 and perforations 12 cooperate to provide a stabilizing function that permits limited lateral movement, but prevents the dish from moving upwardly out of engagement with the creep portion of the floor of the pen. Another contributing factor to maintaining the dish in an engaged position with the perforated floor is its total weight. The combined weight of the plastic dish and the stainless steel pegs should preferably be at least three pounds.

Figure 4:
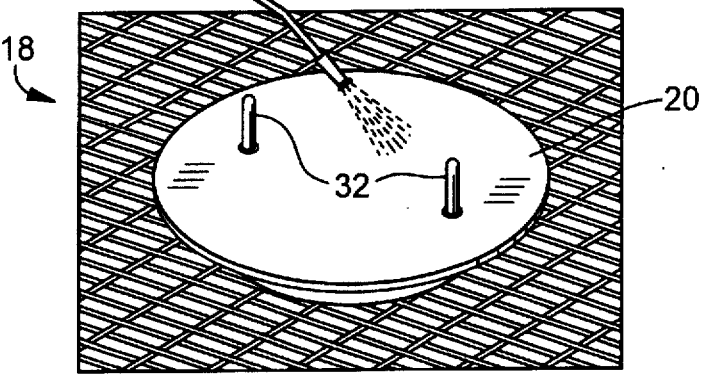
FIG. 4 is a perspective view of a floor area of a farrowing pen wherein the feeder device has been lifted from engagement with the floor after cleaning and overturned for further cleaning of its underside.

The dish, even though of substantial weight, is completely portable and may be easily moved about on the floor of the pen. In a secured position on the floor, of course, a piglet has feed available from any side of the feeder. The dish is also easy to clean. As shown in FIG. 4, the feeder of the present invention can be simply flushed out by means of a hose and then inverted to drain and allowed to dry.

While the present invention has been described with reference to the above preferred embodiments, it will be understood by those skilled in the art, that various changes may be made and equivalence may be substituted for elements thereof without departing from the scope of the present invention. In addition, modifications may be made to adapt a particular situation or material to the teachings of the present invention without departing from the scope of the present invention. Therefore, it is intended that the invention not be limited to the particular embodiments disclosed for carrying out this invention, but that the present invention includes all embodiments falling within the scope of the appended claims.

I claim:

1. A creep feeder device comprising
   substantially circular base member means for engaging in secured contact with perforated floor means of a farrowing pen,
   circular wall means integrally formed with and rising from the base member means for receiving piglet feed therein,
   said base member means having a diameter substantially greater than a diameter of said wall means, and having
   apron means extending outwardly from and completely around said wall means and having a width substantially equal to the difference between the diameter of said base member means and the diameter of said wall means, and
   a plurality of peg means extending downwardly in a direction substantially normal to a bottom side of said base member means for interstitial engagement with individual openings of said perforated floor means, and
   said bottom side of said base member means includes inserts embedded therein for threadably receiving said peg means.

2. A creep feeder device as claimed in claim 1 wherein the width of said apron extending outwardly from said wall member means is sufficient to permit all feeding piglets to rest their forelegs on said apron.

3. A creep feeder device as claimed in claim 1 wherein said apron has a width of at least two inches.

4. A creep feeder device as claimed in claim 1 comprising a total weight of at least three pounds.

5. A creep feeder device as claimed in claim 1 wherein said downwardly extending pegs are effective to hold said feeder in limited lateral movement within said individual openings of said perforated floor means a sufficient distance to prevent being lifted therefrom.

6. A creep feeder device as claimed in claim 1 wherein said circular wall means forms a reservoir container for feeding weaning piglets therefrom, and said apron extends outwardly a substantially uniform distance from said wall means.

7. A creep feeder device as claimed in claim 1 wherein said base member means, said circular wall means and said apron means are formed as a discrete unit from polypropylene.

8. A creep feeder device as claimed in claim 1 wherein said plurality of peg means are formed from stainless steel.

9. A creep feeder device as claimed in claim 1 wherein said circular wall means forms a reservoir container for feeding weaning piglets therefrom, said plurality of said peg means in interstitial engagement with openings of said perforated floor means are effective to permit limited lateral movement and have sufficient length to prevent disengagement of said device by piglets pushing said container and feeding therefrom, and said apron being of sufficient width so as to accommodate feeding piglets resting their forelegs thereon.

10. A creep feeder device as claimed in claim 1 wherein said circular wall means has a substantial height of at least three inches.

11. A creep feeder device as claimed in claim 1 wherein said base member means has a diameter of at least twelve inches and no more than thirteen inches and said diameter of said circular wall means is substantially eight inches.

12. A creep feeder device as claimed in claim 1 wherein said plurality of peg means comprise no more than two.

13. A creep feeder device as claimed in claim 1 wherein said base member means, said circular wall means and said apron means are formed as a discrete unit from one of the polyolefine family of materials.

* * * * *